March 21, 1933. G. DE MONGE 1,902,356
SYSTEM FOR TRANSMITTING MOVEMENT
Filed July 18, 1928 3 Sheets-Sheet 1
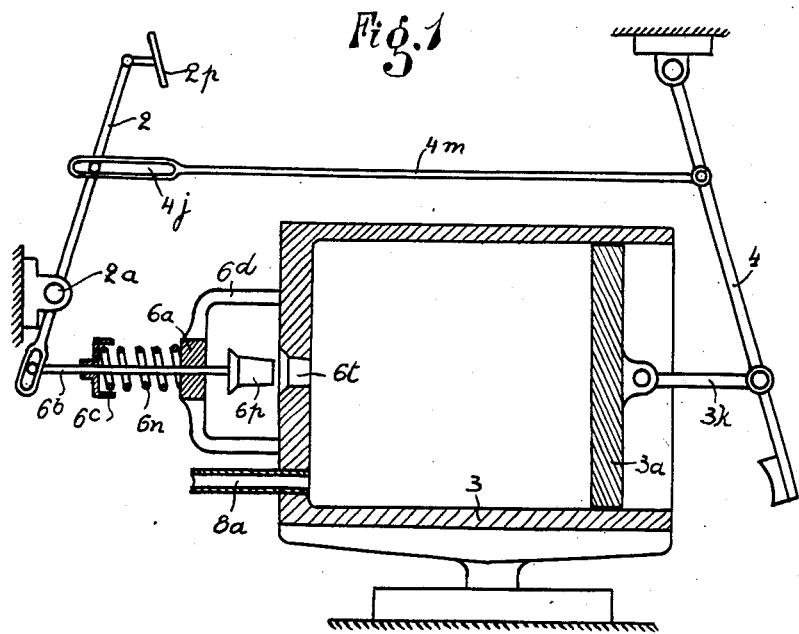
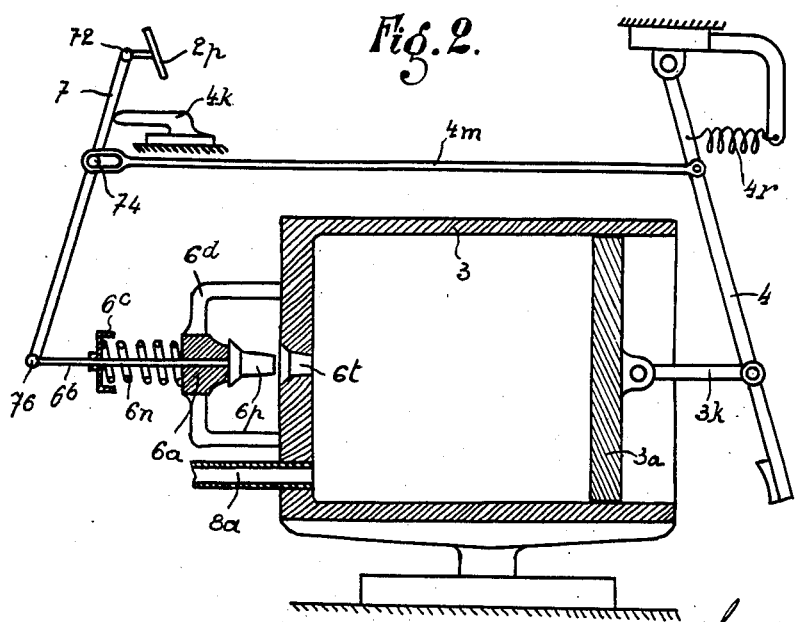

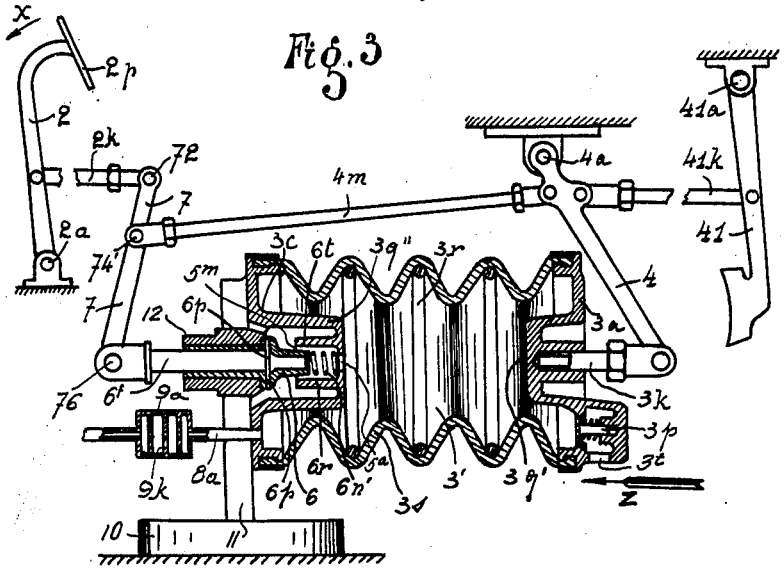
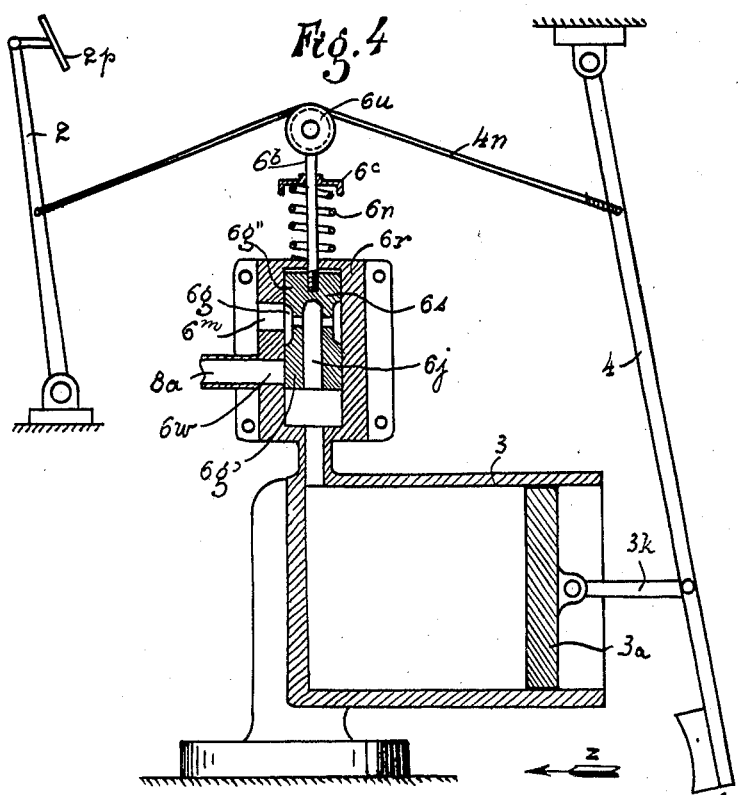

Patented Mar. 21, 1933

1,902,356

UNITED STATES PATENT OFFICE

GÉRARD DE MONGE, OF BRUSSELS, BELGIUM, ASSIGNOR TO FABRICA ITALIANA MAGNETI MARELLI, SOCIETA ANONIMA, OF MILANO, ITALY

SYSTEM FOR TRANSMITTING MOVEMENT

Application filed July 18, 1928, Serial No. 293,589, and in Belgium July 23, 1927.

This invention relates to a system for transmitting movement or power; particularly to a system of transmission for vehicles to control the brakes thereof.

An object of the invention is to provide mechanism adapted to operate the brakes of a vehicle, and to be utilized for other purposes also, and comprising a controlling lever to be moved by the foot of the driver or operator in conjunction with means for generating auxiliary power; so that the brakes can always be put on with a relatively great degree of force.

In its preferred form the auxiliary power is furnished by controlling the pressure of a suitable fluid or gaseous medium within a chamber of variable volume; one part of which is movable and subject to the action of atmospheric pressure. By reducing the pressure within the chamber, the movable part thereof is actuated in response to the outside pressure and operates through suitable connections to constrain the brake elements into engagement with the wheels of the vehicle in the manner required.

In certain well known constructions of the kind above mentioned, the system is controlled by a valve of suitable type. It has been found that, with such regulators, the variation of pressure obtained is such that, for a given movement of the valve at the final part of its travel, a much greater change of pressure results than from an equal movement at the beginning of the travel. This fact, when auxiliary power is used constitutes a serious drawback, for as it prevents the perfect gradual operation of the brakes.

According to the invention this defect is obviated by a valve controlled by the action of a spring, and having such form that movements of said valve of the same amplitude, taking place at any point of the travel, will cause practically identical variations of pressure. Hence movement of the valve always results in a uniform variation of the pressure, and perfect graduation can be obtained.

In its preferred embodiment, the invention has the further advantage that, by virtue of gradual alterations in working pressure, the operator is enabled to ascertain the force with which the brakes are applied, because the aforesaid spring is compressed during the movement of the valve, and therefore the resistance of the spring increases and opposes the operator; through transmission elements between the valve and a member actuating the latter. The reaction of said spring increases gradually and therefore remains proportional to the pressure in the power chamber; that is to say to the amount of the auxiliary power that is actually being expended.

Further, when the operating member is at rest, the valve, under the action of the spring which opposes its movement and with the co-operation for instance of a stop, occupies a position which produces such a difference of pressure between the interior and the exterior of the power chamber that the auxiliary power becomes active in order to keep hold elements of the transmission system in the places required to ensure the taking up of the mechanical play or lost motion unavoidably existing at different points of articulation. This arrangement causes the auxiliary power to take effect immediately when the operating member is actuated.

The invention also provides for rendering the member actuated by the auxiliary source of power dependent on the effort applied to the actuating member and the influence of another actuated element. To this end, the operating member of the control system may be connected directly to the said second actuated element in order to control the system in an efficient manner.

The drawings accompanying the present specification show, by way of example, several different methods of practicing out the invention. While the constructions shown are preferred, I, of course, may vary the shape, size and arrangements of the parts without going beyond the principle or exceeding the scope of the invention.

In the said drawings:

Figure 1 shows a construction in which one form of the invention is embodied;

Figures 2, 3, 4 and 5 show several modifications;

Figure 5:
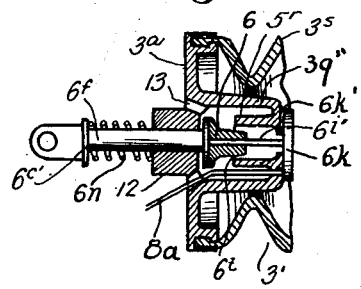

In Figures 1 to 4, the member 4 to be actuated is joined on the one hand by a link 4m to the pedal 2p, of a pedal lever 2 and on the other hand, by a second link or rod 3k, to the movable piston 3a of a chamber 3 for enclosing a medium to afford auxiliary power. Such power does its work under differences of pressure between the exterior of the said chamber, which is at atmospheric pressure, and the interior, the pressure in which can be reduced by connecting it through a conduit 8a, for instance, to the supply pipe of an internal combustion engine on a vehicle, the brakes of which are operated by this system; in which the force transmitted by the two connections 4m and 3k act in the same direction on the operated member 4, which may carry a brake shoe or be directly connected to one or more brake shoes.

Figure 6:
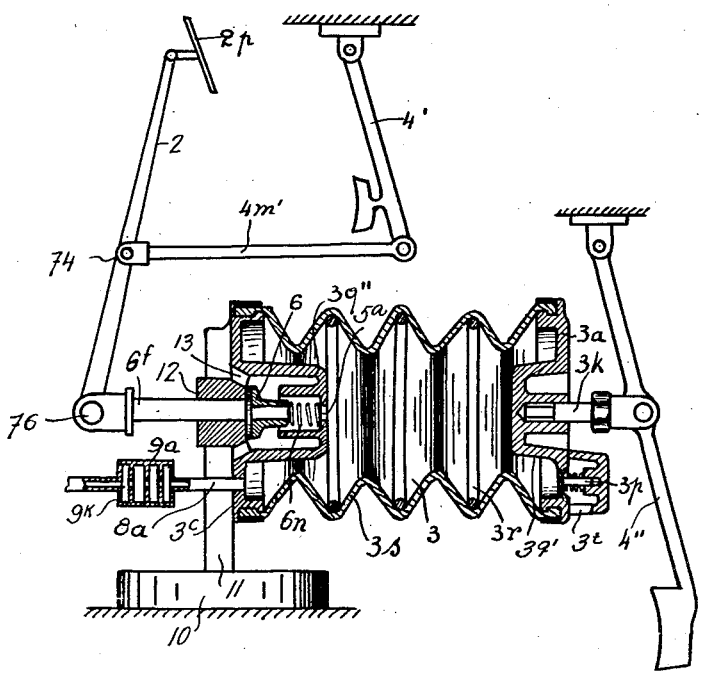
Figure 6 shows a construction in which the actuated member comprises two parts movable independently of each other.

The chamber 3, the interior of which is of variable volume, can be made in any desired manner, for instance, in the form of a cylinder provided with a piston (Figures 1, 2 and 4), or a diaphragm or bellows (see Figures 3 and 6).

In Figures 1 to 3, as well as in Figure 6, this chamber 3 is in open communication through the conduit 8a with the source of suction, i. e., the intake manifold of the engine or motor, and the pressure in the said chamber is regulated by varying a gaseous medium, such as air, entering the chamber and passing through the conduit 8a.

In Figures 1–3 and Figure 6, the chamber 3 is always by a current of air admitted through the orifice 6t and flowing out through the pipe 8a, and the throttling of the air at the inlet 6t results in variations of pressure in the interior of the said chamber.

The variable throttling is obtained through the control of the port 6t and by a valve 6p which can enter therein, against the action of a return spring 6n.

In the apparatus of Figure 1, the spring 6n is compressed by the action of the lever 2 carrying the thrust plate 2p and pivoted at 2a on a suitable support. Moreover, the link 4m comprises a slot 4j. This slot makes it possible to regulate the apparatus if desired so that in normal working with the auxiliary power, no force is transmitted by the link 4m. In this case, a given amount of foot pressure on the pedal 2p will correspond to a certain auxiliary effect determined by the degree of pressure in the chamber 3 and transmitted by the connection 3k.

The valve 6p is connected to a valve rod 6b which slides in a bearing 6a secured to the cylinder 3 by rigid arms 6d. On the valve rod 6b is a fixed collar 6c between which end the bearing 6a is a spring 6n.

Under these conditions, the operating member 2 is not subject to the influence of the movement of the actuated member 4.

Figures 2, 3 and 4 present constructions in which such an influence can arise. In these constructions, whilst the power exerted by the operator on the operating member or pedal 2p continues, the relative position of the said pedal can undergo variations due to the changes of position of the operated member.

In Figure 2 a pedal lever 7 pivoted at 76 to the valve rod 6b, has a pin-and-slot connection 74 to the rod 4m; and the fixed pivot 2a shown in Figure 1 is omitted. A retractile spring 4r is united to a fixed point and the actuated part 4, and the stop 4k is provided to limit the return movement of the lever 7. In other respects the construction of the apparatus shown in Figure 2 is the same as that illustrated in Figure 1.

It follows that the valve 6 of the apparatus of Figure 2 occupies a position which depends not only on the movement of lever 7 but also on the movement of the rod 4m in the opposite direction by the piston 3a.

When the pedal lever 2p is pressed with the foot and then released, the spring 4r returns the parts to their original position; which is determined by the stop 4k. When the lever 7 thus rests against the stop 4k the action of the spring 4r continues and tends to move the lever 7 towards the cylinder 3, to carry the valve 6p to a slight extent into the port 6t. The strength of the springs 4r and 6n is such that, when the valve thus comes to rest in a position of equilibrium, the air flowing into the chamber 3 would be constricted just enough to cause the pressure in the chamber 3 to fall slightly, so that the piston 3a normally exerts a slight permanent tension on the connection 3k.

In Figure 3, the thrust plate of pedal 2p is supported by a pedal lever 2 pivoted at 2a and connected by a rod 2k to a point 72 of the lever 7. The link 4m is joined as before to the member 4 and is also pinned to the lever 7 between the extremities thereof as indicated at 74'. The lever 41 pivoted at 41a and connected to the actuated part 4 by the rod 41k represents the member which actuates the brakes.

Instead of a cylinder, a bellows 3' is employed; the body 3s of the bellows being made of suitable material and having ends 3c and 3a, the former being fixed and the latter movable and rigidly connected to the part 3k. The fixed end 3c has a bearing projection 12 in which is the slidable rod 6f of the valve 6 pinned at 76 to the lower end of the lever 7. This bearing 12 is integral with or otherwise secured to a standard 11 which supports the bearing and the end 3c; the standard 11 rising from a base or foot 10. The end 3c also has an internal projecting boss 3q'' and within this boss, integral with the inner extremity thereof and projecting in the reverse direction; that is, towards the bearing 12, is a smaller boss 5r. The inner extremity of the boss 5r has an inlet port 5a surrounded by the boss 5r, but of smaller size, so that the spring 6n', which opposes the valve 6 may rest upon the inner end of the boss 5r. The interior of the boss 3q'' may communicate with the outside air through one or more apertures 5m. Hence as long as the ports 5a and 5m are open, the inside of the bellows can communicate with the atmosphere and this communication is reduced or cut off as the valve 6 is forced into the boss 5r, the front of this boss being opened as shown at 6t to receive the small end of the valve 6. In the other end of the bellows is a spring pressed outwardly opening valve 3p which controls a port 3t; this valve acting as a relief valve and opening when the pressure inside the bellows is higher than the pressure outside. The bellows may be reenforced by inside rings 3r at the bends of larger diameter making up the corrugations thereof.

The valve 6 of the control system is relatively long and tapering so as to afford a passage to the current of air, the variation of which in area is slight for a considerable movement of the valve 6.

The valve 6 is always acted upon by a spring 6n' tending to cause it to open the orifice or inlet port 6t.

Whenever the operator presses with his foot upon the pedal 2p to move the lever 2 in the direction of the arrow x, the lever 7 is turned to force the valve 6 inward and restrict the orifice 6t. Then the air in the bellows 3' drops in pressure; with the result that the atmospheric pressure causes the bellows to contract; the end 3a moving towards the end 3c and pulling open the lever 4 to actuate the brake lever 41. The operation of the lever 4 also takes effect through link 4m and tends to move the lever 7 the other way; that is, the lever 4 opposes the lever 2. Hence the force on the lever 2 must be increased whenever the effect of the auxiliary power is to be increased. Obviously the increase of the force compressing the spring 6n' must be greater than the thrust exerted through the link 4m in the opposite direction when the pressure drops in the bellows 3'. A similar effect is obtained in the construction shown in Figure 2, as soon as the link 4m is moved to the left far enough to take up the play allowed by the pin-and-slot connection 74.

In other words, if the operator presses upon the pedal 2p with a certain degree of force, the end 3a of the bellows will move towards the end 3c, causing the link 4m to exert a force on the lever 7 in opposition to the lever 2; and if the pressure on the pedal 2p is not changed, the parts connected to the end 3a of the bellows and the levers 2 and 7 tend to go into a state of equilibrium, because if the lever 2a is pushed forward a short distance and then allowed to come to a stop, there is a tendency for the lever 4 acting upon the link 4m to swing the lever 7 around the point 72 and thus move the valve slightly away from closed position. Or from another point of view, it may be said that after the first displacement of the lever 2, the link 4m together with the rod 2k simply cause the lever 7 to swing about the point 72 which remains stationary, as long as the operator does not change the degree of thrust upon the pedal 2p. Thus there are really two forces which act on the lever 2. One is that which pulls the upper end, due to the thrust upon the lever 2; and the other is the back thrust, due to the compression of the spring 6n', and is in the same direction. The link 4m tends to balance the resultant of these two forces. A given movement, then, of the lever 2 results in the movement of the end 3a of the bellows to put on the brakes with a certain force and the brakes remain on as long as the lever 2 is not moved further. If it is moved further, the brakes are then applied with even greater effect.

In the modifications of Figs. 2 and 3 also, the spring 4r and 6n so act as to produce a pressure in the chamber of variable volume low enough to create a small force acting upon the lever 4 by which the parts are held in the most efficient position for putting on the brakes whenever the lever 2 is depressed.

The current of the air through the bellows 3' of Figure 3 can be reduced by the interposition in the pipe 8a, of a device to increase the resistance to the flow, such as a baffle plate, expansion chambers or the like, the action of which is added to the loss produced by the throttling of the current of air around the valve 6 followed by an expansion in the chamber 3'.

In the drawings, this device comprises an enlargement 9a having partitions 9k provided with minute apertures. Obviously, the same result may be obtained by using a pipe 8a having a relatively narrow cross-section over a certain length.

If the action of the disc 3a lags behind relatively to the action transmitted by the direct connection to the brakes of which the rod 4m forms a part, the pressure tends to rise in the bellows 3s. In order to prevent the said pressure from rising above atmospheric pressure, the valve 3p opens so that the air in the bellows 3' at higher pressure can flow through the opening 3t.

Figure 4 shows a construction working in the same manner as that shown in Figures 2 and 3.

Between the operating member or pedal lever 2 and the operated member 4 is a flexible connecting element 4n which passes over a grooved pulley 6u being supported by the rod 6b of the slide valve 6s and moved towards the flexible link 4n by the aforesaid spring 6n.

The slide valve 6s contains a ductor passage 6j in communication with the cylinder 3, and also with an external groove or recess 6g communicating with the duct 6j. The valve is enclosed in a casing 6m having two parts 6v and 6w communicating respectively with the open air and the pipe 8a; connected to the suction conduit of an internal combustion engine.

When the slide valve 6s is in the position of rest, the end 6g' closes the port 6w, and port 6v is in communication with the groove 6g; hence atmospheric pressure obtains in the groove 6g and the chamber 3. When the pedal lever 2 is pressed forward, the tension of the flexible link 4n increases, and the spring 6n is compressed and slide valve 6s moves so as to carry the groove 6g progressively into communication with the port 6w and to cover progressively by its end 6g'' the port 6v.

The pressure in the chamber 3 will thus decrease. The auxiliary power thus produced, being added to the force transmitted directly by the flexible link 4n, produces a movement of the operated member 4 in the direction of the arrow Z, to put on the brakes.

When the suction existing in the conduit 8a drops, the pressure in the chamber 3 increases, the auxiliary power transmitted by the connection 3k decreases, and the operated member is moved in the direction opposite to that of the arrow Z. If the operator continues to exert the same force on the pedal 2, the latter nevertheless comes back to an extent corresponding to the return movement of the operated member 4, because as the tension in the flexible connection likewise remains constant, the point at which the flexible connection is secured to the actuating member 2 moves to an extent corresponding to the distance through which the other end of the link in connection with the member 4 has been moved.

Figure 5 shows a modified construction of the valve and associated parts of Figure 3, whereby the communication between the chamber 3 and the source of suction may be interrupted when the parts assume their position of rest.

The rod 6b of the valve 6 is reduced and extended through the valve 6i and carries a disc 6k which is adapted to close the orifice presented by the conduit 8a into the chamber 3'.

In order to prevent the said disc from cutting off the communication between the said chamber 3' and the atmosphere, a groove 6k' communicating with the orifice 6t, is provided on the face of the projection 3q'', against which the disc 6k comes to rest. Hence as the valve 6 moves against the spring 6n', the disk first uncovers the groove 6k'.

Figure 6 relates to a construction in which two independent actuated elements 4' and 4'' are connected, one, 4', directly to the operating element; the other 4'' being connected to the auxiliary power which is controlled by the movements of the lever 2 and valve 6.

The part 4' is joined by the link 4m' to the lever 2 and the part 3k connects the part 4'' to the auxiliary source of power, which comprises the movable end of the bellows 3'.

The operation is similar to that of the constructions shown in Figures 2 and 3. The power transmitted to the parts 4' and 4'' operating the brakes is independent of the relative position of the parts 4' and 4''. This construction gives control of all the brakes of a motor vehicle. The link 4' may actuate the rear brakes, and the part 4'' the front brakes.

What I claim is:—

A transmission system comprising a cylinder having a piston, a lever connected to the piston, a valve casing having an opening for admitting a power medium to the cylinder and having means for exhausting said medium therefrom, a sliding valve having a duct therein and an external groove to control said opening and said means, a rod connected to said valve, a pulley on said rod, an actuating member and a flexible connection joining said lever and said member and passing over said pulley.

In testimony whereof I have affixed my signature.

GÉRARD DE MONGE.